United States Patent
Cheon et al.

(10) Patent No.: US 10,657,986 B2
(45) Date of Patent: May 19, 2020

(54) APPARATUS, METHODS, AND SYSTEMS FOR ACHIEVING LINEAR TONEARM TRACKING FOR A RECORD TURNTABLE

(71) Applicant: Koolance, Inc, Auburn, WA (US)

(72) Inventors: Kioan Cheon, Auburn, WA (US); AnKuk Song, Anyang-si (KR)

(73) Assignee: Koolance, Inc., Auburn, WA (US)

( * ) Notice: Subject to any disclaimer, the term of this patent is extended or adjusted under 35 U.S.C. 154(b) by 0 days.

(21) Appl. No.: 16/098,776

(22) PCT Filed: May 4, 2017

(86) PCT No.: PCT/US2017/031168
§ 371 (c)(1),
(2) Date: Nov. 2, 2018

(87) PCT Pub. No.: WO2017/192922
PCT Pub. Date: Nov. 9, 2017

(65) Prior Publication Data
US 2019/0130934 A1   May 2, 2019

Related U.S. Application Data

(60) Provisional application No. 62/331,932, filed on May 4, 2016.

(51) Int. Cl.
*G11B 3/38* (2006.01)
*G11B 3/06* (2006.01)

(52) U.S. Cl.
CPC . *G11B 3/38* (2013.01); *G11B 3/06* (2013.01)

(58) Field of Classification Search
CPC .................................. G11B 3/38; G11B 3/06
USPC ...................................... 369/251–255, 264.7
See application file for complete search history.

(56) References Cited

U.S. PATENT DOCUMENTS

| 4,346,466 A | 8/1982 | Kanchev |
| 4,346,467 A | 8/1982 | Souther |
| 4,434,483 A * | 2/1984 | Vinogradov ............. G11B 3/32 369/244.1 |
| 4,455,641 A | 6/1984 | Sliski |
| 4,722,080 A | 1/1988 | Dieckmann |

FOREIGN PATENT DOCUMENTS

WO      2016/138317 A1      9/2016

* cited by examiner

*Primary Examiner* — Allen T Cao
(74) *Attorney, Agent, or Firm* — Seed IP Law Group LLP (57) ABSTRACT

Apparatus, systems and methods for use in imparting linear tonearm tracking for a record player are provided. The systems can include a joint member having three separate movable connections to a tonearm, guiding slot and slidable pivot base, wherein a rear pivot location of the tonearm is on the slidable pivot base. A movement of the tonearm can cause the joint member to adjust a position of the slidable pivot base, as a function of a configuration of the guiding slot, and this combination of interactions is combined to impart substantial linear tracking for the tonearm.

17 Claims, 13 Drawing Sheets

APPARATUS, METHODS, AND SYSTEMS FOR ACHIEVING LINEAR TONEARM TRACKING FOR A RECORD TURNTABLE

CROSS REFERENCE TO RELATED APPLICATION(S)

This application claims priority to U.S. Provisional Patent Application No. 62/331,932, filed May 4, 2016, which is incorporated herein by reference in its entirety.

BACKGROUND

1. Technical Field

This application relates to apparatus, methods and systems for use with a record player/phonograph to assist in providing tangential (linear) tracking of a stylus on a record during play.

2. Related Art

Figure 1:
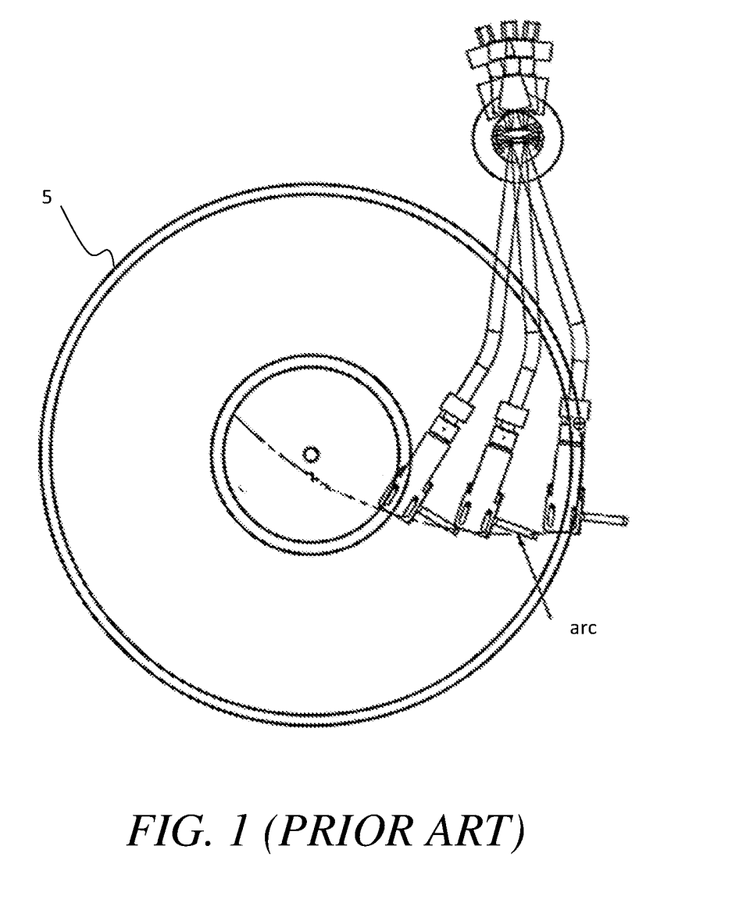
FIG. 1 is an overhead plan view of a platter and tonearm assembly of a prior art turntable system.

Record players commonly comprise a turntable system with a tonearm that swings horizontally/laterally about a fixed pivot axis. The fixed pivot axis is typically located adjacent to a perimeter of a platter of the turntable system. A stylus of the tonearm typically travels through an arc as it tracks a groove in a record, such as shown in FIG. 1 (prior art).

However, as is commonly accepted, it is desirable that the stylus travels a single radius path as it moves radially inward across the face of a record, rather than in an arc, within the record groove during play, approximating a consistent tangent path, or a linear tracking path (e.g., relative to concentric groove portions). It is also commonly accepted that lack of such linear tracking can cause tracking distortions, and undesirable stylus/groove side pressures on a side of the stylus because of the frictional force (e.g., "skating force") between the stylus and the walls of the groove of the record.

Furthermore, lack of linear tracking of the stylus movement within the record groove can be especially undesirable for stereo records containing separate audio channels on opposite sides of the record groove. That is, the lack of linear tracking can disturb audio balance as a result of unbalanced side pressures on the grooves.

Although some prior art tonearms provide or approximate linear tracking, they are often very complex (increasing associated expense), or do not achieve the desired goal.

BRIEF SUMMARY

In some embodiments, a tonearm tracking system is provided for use in playing a record, the tracking system comprising a tonearm and a joint member movably connected to the tonearm and movably connected to a track having a nonlinear guiding slot for guiding a guide member of the joint member. The joint member can also be connected by a hitch member to a slidable pivot base to which the tonearm is pivotably connected at a rear pivot location of the tonearm. Due to these three separate connections between the joint member, and the tonearm, guiding slot and pivot base, when the tonearm is pivoted, this can cause the joint member to move and be guided by the guiding slot, which in turn, pushes or pulls the slidable pivot base. Thus, in various embodiments, a rear pivot location of the tonearm on the slidable pivot base moves as a function of the guiding slot configuration. As will be appreciated by those skilled in the art after reviewing the present disclosure, the guiding slot configuration, as well as various accompanying components of the present disclosure, can be selectively configured to control position of the tonearm components during record play, and hence, impart substantial linear tracking.

Various methods for employing the tonearm tracking systems and assemblies of this disclosure are also provided.

BRIEF DESCRIPTION OF THE DRAWINGS

FIG. 3a is a perspective view of the platter and tonearm assembly of FIG. 2, assembled as part of a tonearm system.

FIG. 3b is an enlarged partial perspective view of the platter and tonearm assembly in FIG. 3a.

FIG. 3c is an enlarged cross-sectional overhead plan view of the receiver housing and beam splitter of the tonearm assembly of FIG. 3a.

DETAILED DESCRIPTION OF EXEMPLARY EMBODIMENTS

In the present description, certain specific details are set forth in order to provide a thorough understanding of various embodiments of the disclosure. However, upon reviewing this disclosure one skilled in the art will understand that the various embodiments disclosed herein may be practiced without many of these details. In other instances, some well-known structures and materials associated with turntable components, electronic audio components, and records, have not been described in detail to avoid unnecessarily obscuring the descriptions of the embodiments of the disclosure.

In the present disclosure, to the extent the terms "about" and "approximately" are used, they mean±20% of the indicated range, value, or structure, unless otherwise indicated. In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, which terms and variants thereof are intended to be construed as non-limiting. The definitions in this paragraph are intended to apply throughout this disclosure unless otherwise expressly stated.

Figure 2:
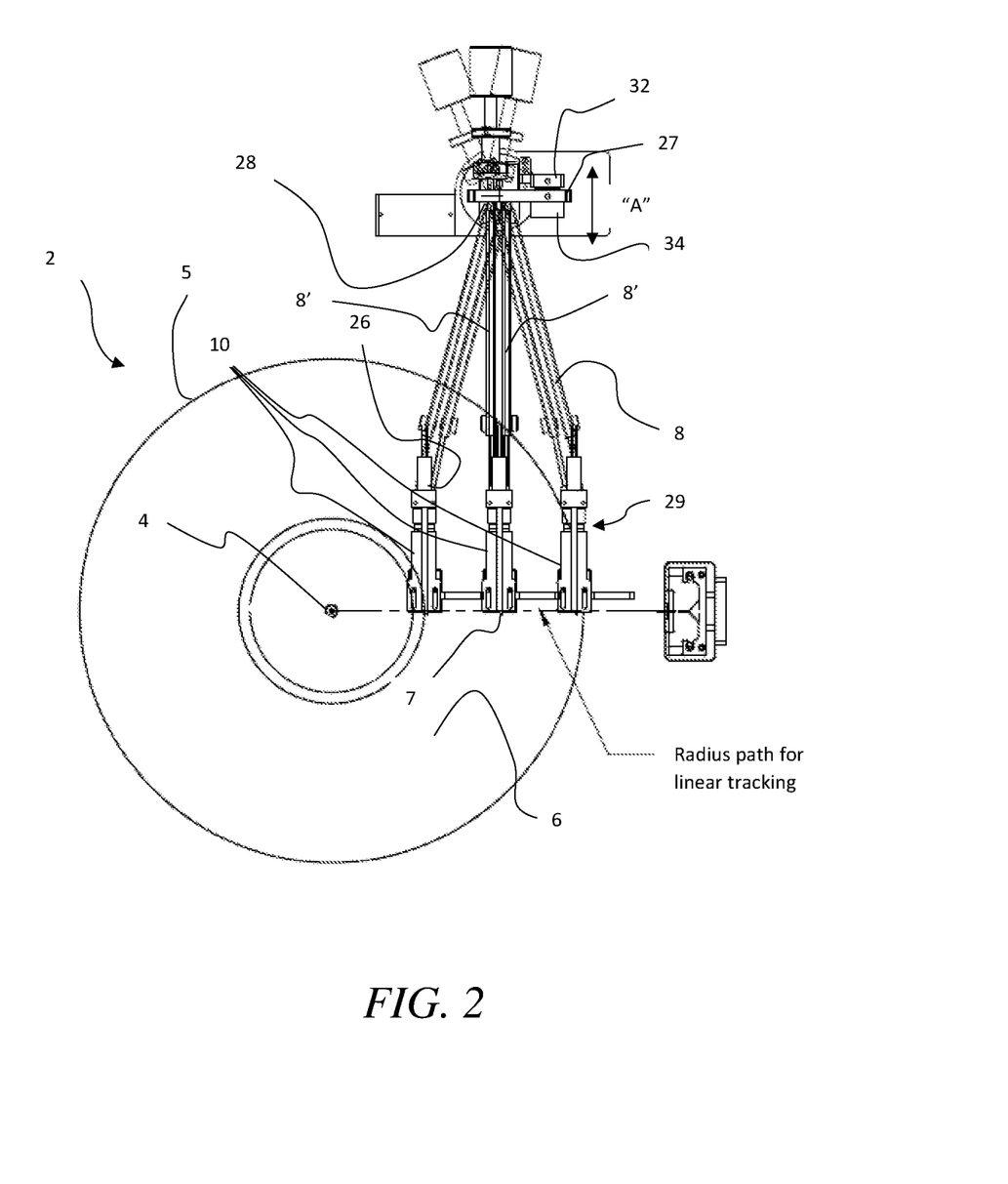
FIG. 2 is an overhead plan view of a platter and tonearm assembly for some embodiments of the present disclosure.

FIG. 2 shows an overhead plan view of a part of a turntable system 2, including a tonearm 8 and platter 5, for some embodiments of the present disclosure, using a new and novel laser guided tonearm system to achieve linear tracking. Only one tone arm 8 is intended to be illustrated in FIG. 2, but it is shown in three different positions, a center position, and a pivoted position on left and rights sides thereof.

Figures 3A, 3C:
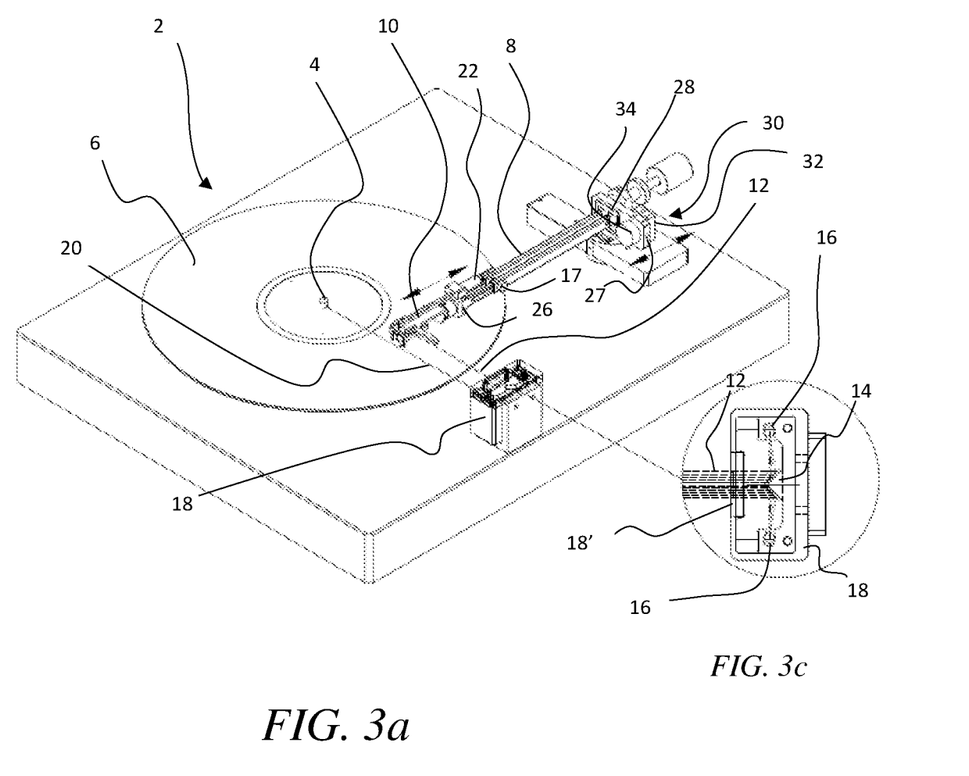
Figure 3B:
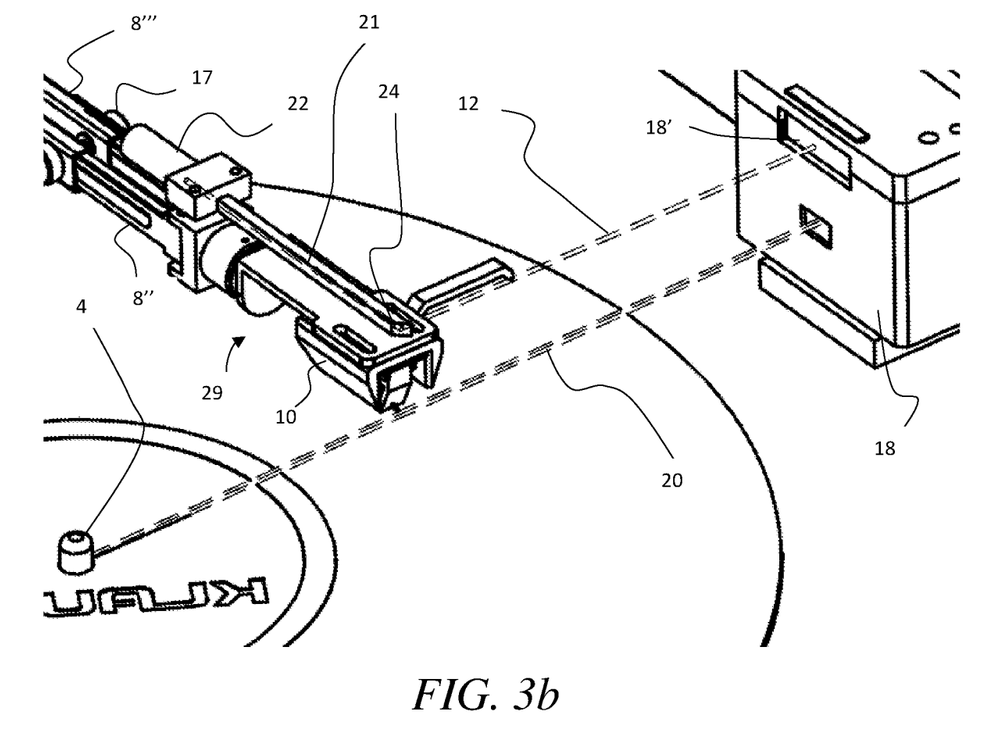

FIGS. 3a & 3b show a perspective, and a close-up partial perspective view, respectively, of an embodiment of the turntable system 2 of the present disclosure. In some embodiments, the tonearm 8 has at least two pivot locations, a front pivot 26 near the head cartridge 10, and rear pivot 28, proximate a vertical base plate 27. The pivot members, or pivots, on the tonearm 8 can be selected in construction from among of variety of options (e.g., a pivot pin, or otherwise), as will be appreciated by those skilled in the art after reviewing the present disclosure.

As can be seen in FIGS. 2 and 5a-6, in some embodiments of the present disclosure, the tonearm 8 can swing/pivot laterally inward toward a center spindle 4 about the rear pivot 28, as a needle 7 on the cartridge 10 tracks the record grooves (not illustrated) on a face of the record 6, and a front section 29 of the tonearm 8, which includes the cartridge 10, can pivot (swing left/right) about the front pivot 26, relative to the rest of the tonearm 8. The tonearm 8 an include two parallel extension members 8', and each of the pivots 26, 28, can comprise a pair of pivot connections, one on each corresponding extension members 8'.

As best seen in FIGS. 3a-3c, a laser source 22 can be connected to the front section 29 of the tonearm 8. The laser source 22 can be aligned longitudinally with the front section 29 of the tonearm 8, such that an axial laser beam 21 can be emitted from the laser source traveling forward toward a front end of the tonearm 8, including the cartridge 10, and then be refracted by a refraction mirror 24 laterally outward away from (e.g., at an angle of 90 degrees from) a longitudinal axis of the front section 29 of the tonearm 8. As best seen in FIGS. 3b and 3c, the refracted laser beam 12 can enter a window or opening 18' of a receiver, formed on a receiver housing 18, which can be disposed away from a perimeter of the rotating platter of the turntable 2, and impinge on an edge of a beam splitter 14 (e.g., a mirror or prism) of the receiver. For example, the beam splitter 14 can have opposite refractive sidewalls that converge at an apex edge facing the refracted laser beam 12 and can split the beam 12 into two components that are, in turn, directed at opposite sensors 16 on opposite sides of the beam splitter 14 (See, e.g., FIG. 3c). A difference in intensity/allocation of light to the opposite sensors 16 is then converted to an electrical signal for use in adjusting a magnetic field at electromagnet assembly 30.

Referring to FIGS. 3a, 6, 7a, and 7b, the electromagnet assembly 30 can comprise a first attractive/repulsive component 32, and a second attractive/repulsive component 34, the respective components being configured to exert force relative to one another. In some embodiments, an electromagnetic force exerted between the components is configured to be a function of (e.g., proportional to) a difference in the intensity of light sensed at the sensors 16 in the receiver housing 18. For example, in some embodiments, a biasing component (e.g., a spring) 32' can cause the components 32, 34, to be biased toward one another by default, and the electromagnetic force can be configured to repulse the components 32, 34 as a function of the signal received, overcoming a force of the biasing member. Alternatively, in other embodiments, the biasing component can be configured to cause the components 32, 34 to be biased away from one another by default, and the electromagnetic force can be configured to attract the components toward one another as a function of the signal received, overcoming a force of the biasing member. Finally, alternatively, in some embodiments, no biasing member is provided to bias the components toward, or away, from one another, and a distance between the components can be controlled by repulsive and/or attractive electromagnetic forces (e.g., flipping polarity), as will be appreciated by those skilled in the art immediately after reviewing this disclosure.

In all of the embodiments described above, the rear pivot 28 of the tonearm 8 can be fixedly attached to a base 27 (which can be a vertical base plate), which is, in turn, attached to the second component 34, and both the vertical base plate 27 and second component 34, can be slidably movable toward, and away from, the platter 5 of the turntable (e.g., such as in the directions of arrow "A" in FIGS. 2 & 6), whereas, a position of the first components 32, can be fixed. As such, the adjustment of electromagnetic force described above, to move the components 32, 34, relative to one another, can move the rear pivot 28 in the directions of arrow "A" as necessary to maintain a fixed linear radial path for the needle in the head cartridge, to approximate linear tracking of the needle, as will be immediately appreciated by those skilled in the art after reviewing this disclosure.

Figure 5A:
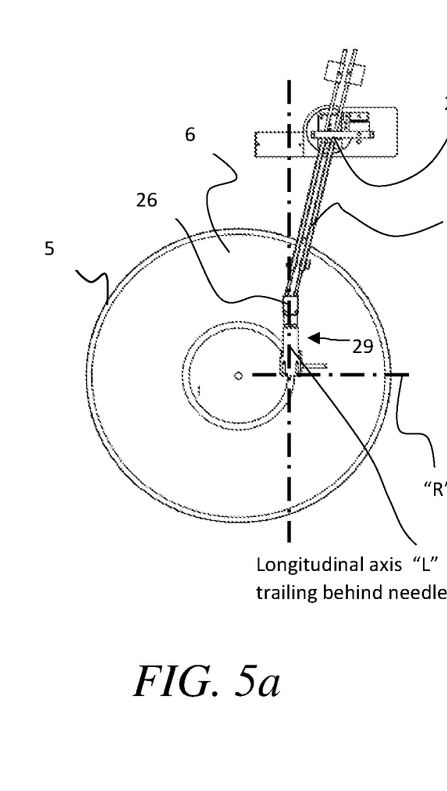
FIGS. 5a-5c are overhead plan views of a platter and tonearm assembly (without the laser beam receiver/beam splitter being shown) of a tonearm system, for some embodiments of the present disclosure, each of the FIGS. 5a, 5b and 5c showing different pivot positions of the tonearm.

That is, for example, referring to FIG. 5a, when the record 6 is rotated in a clockwise direction and the needle tracks grooves, the front section 29 will have a natural tendency to pull away from the rear pivot 28, in a manner such that a longitudinal axis "L" of the front section 29 trailing behind the needle will align with a tangent line of the circular groove being tracked, provided that the longitudinal axis is permitted to float in that trailing position. If so, the longitudinal axis "L" of the front section 29 will remain at 90 degrees relative to a linear radial path "R" of the needle, and a distance between the front pivot 26 and a nearest point on the linear radial path "R" will remain the same throughout travel of the needle. In order to maintain the distance between the front pivot 26 and the linear radial path "R" at a consistent value, the rear pivot 28 must move as a function of the position of the front pivot 26. As described above, in various embodiments of the present disclosure, the movement of the rear pivot 28 is accomplished indirectly based on feedback signal provided by the refracted laser beam 12. That is, by adjusting the electromagnetic force between components 32, 34 to maintain equal light intensity between sensors 16, the rear pivot 28 slides in the directions of arrow "A" to allow the front pivot 26 to maintain a consistent distance from the linear radial path "R," and in turn, a longitudinal axis "L" of the front section 29 stays within a tangent line to allow tangential (linear) tracking.

Figure 4:
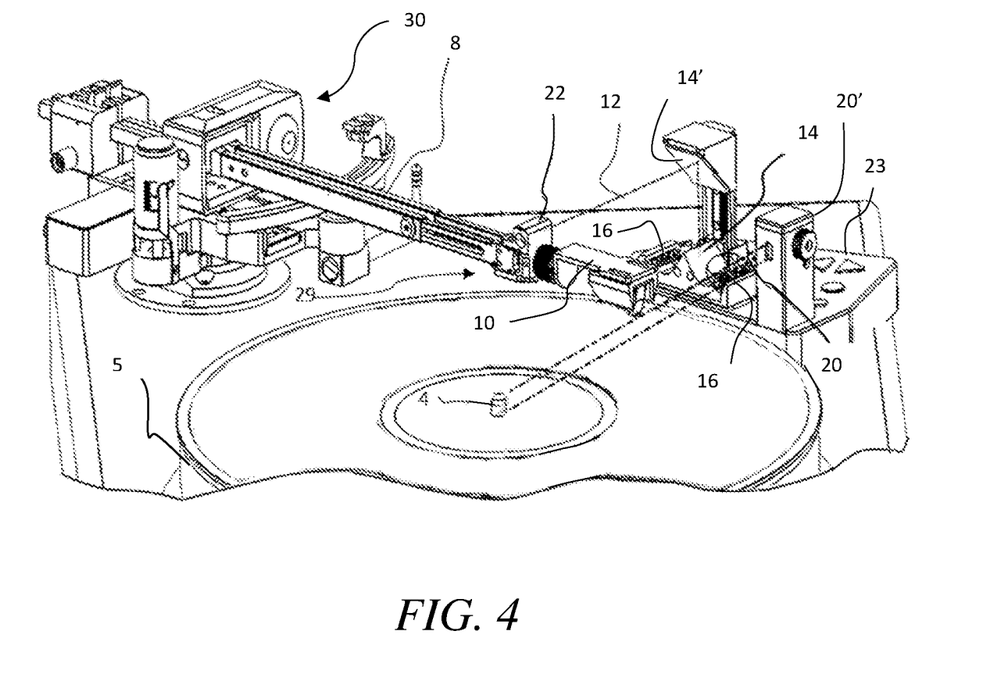
FIG. 4 is a partial perspective view of a platter and tonearm assembly, assembled as part of a tonearm system for an alternate embodiment of the present disclosure.
Figure 5B:
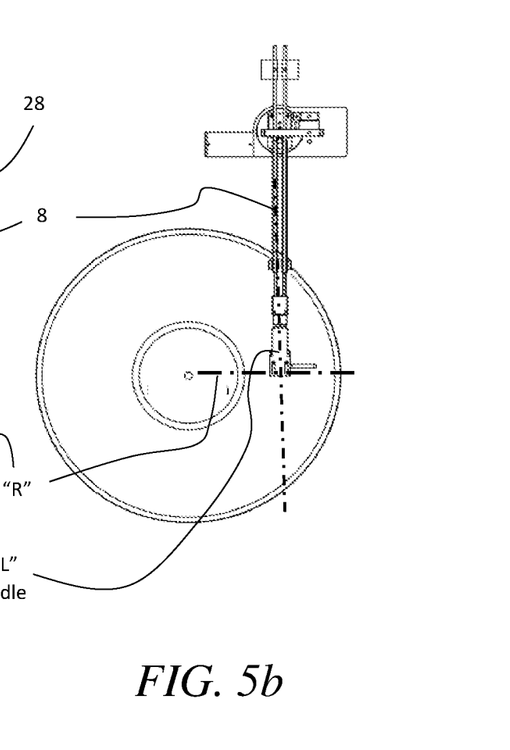
Figure 5C:
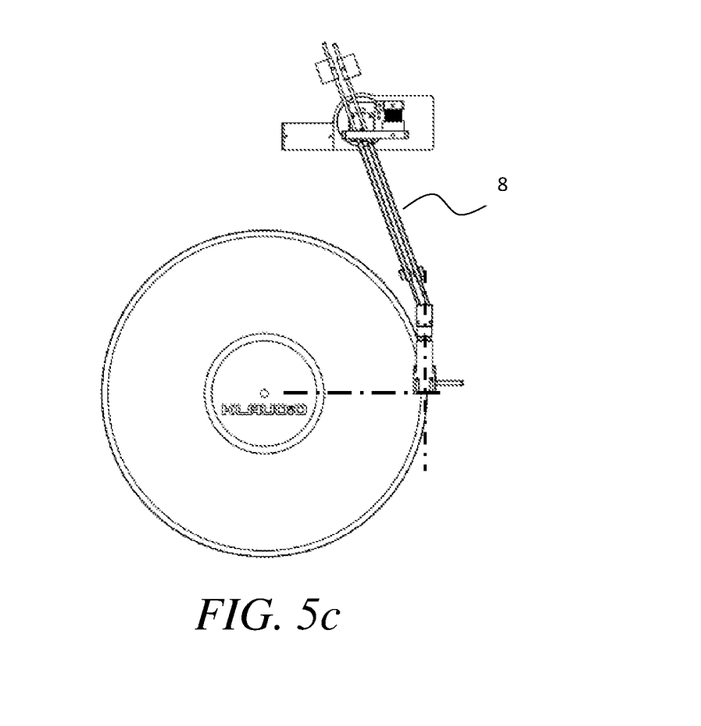
Figure 6:
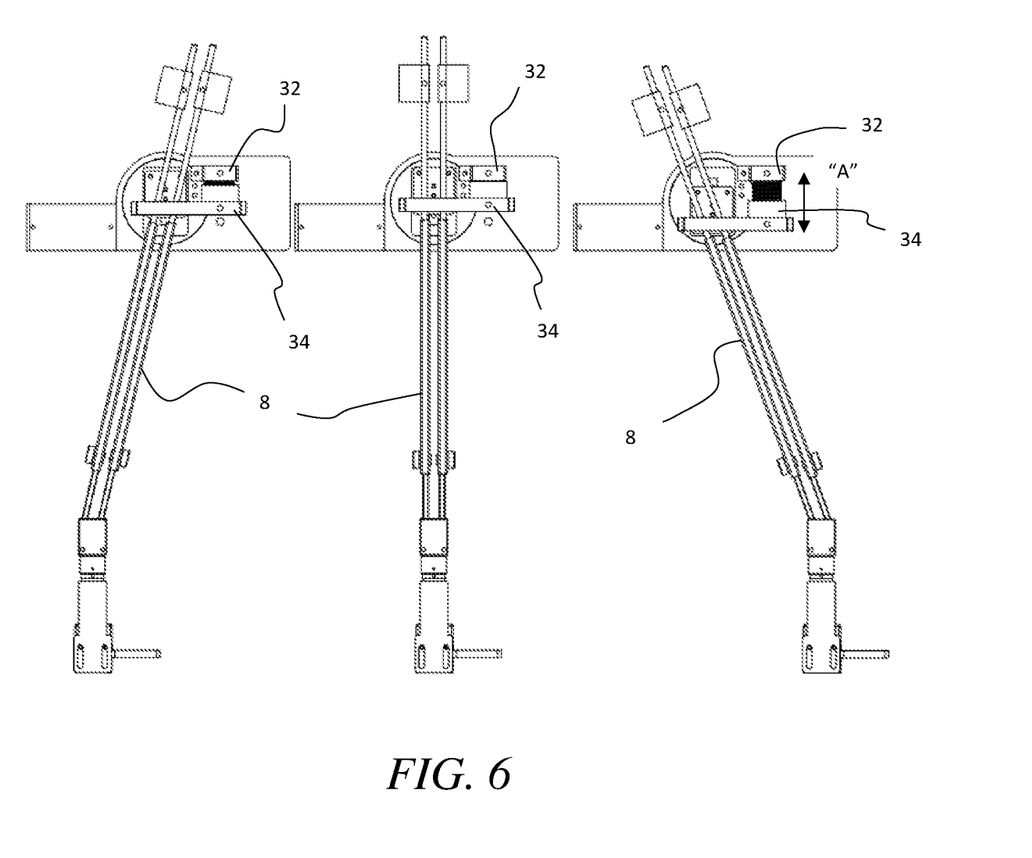
FIG. 6 shows enlarged overhead plan views of the tonearm with electromagnet assembly of FIGS. 5a-5c, in different pivot positions for some embodiments of the present disclosure.
Figure 7A:
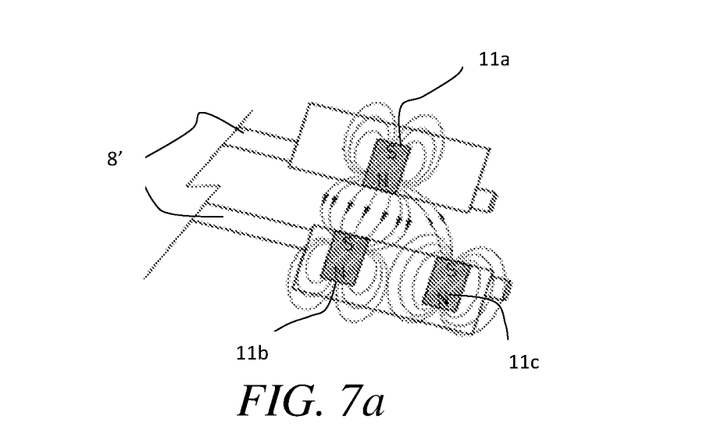
FIGS. 7a-7c shows simplified overhead views of a rear portion of the tone arm of FIGS. 5a-5c in different pivot positions of the tonearm, also showing stabilization magnets, for some embodiments of the present disclosure.
Figure 7B:
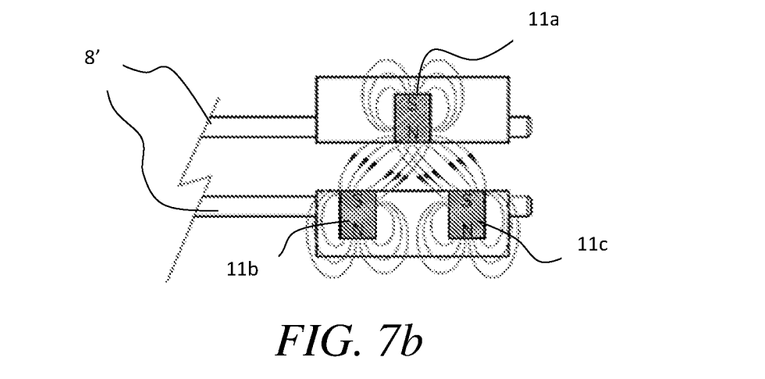
Figure 7C:
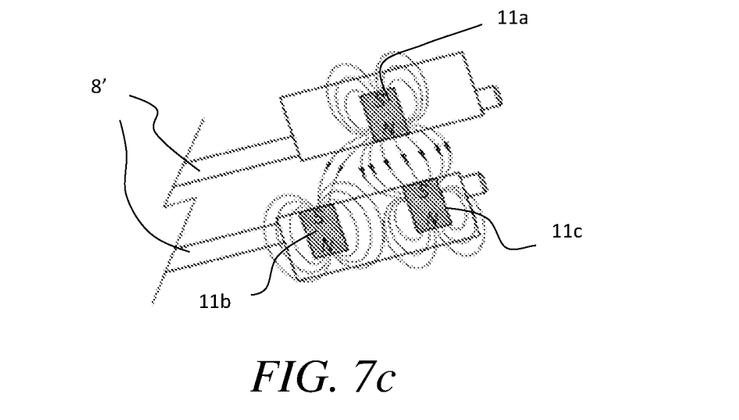

In some embodiments of the present disclosure, a counterweight is provided on each rear portion of a pair of rear longitudinal members (rear portions of extension members 8') of the tonearm, as best seen in FIGS. 2 and 3a. Also, in some embodiments, rear portions of the extension members 8', can include stabilizing magnets, as best seen in FIGS. 4-6, and in particular, FIGS. 7a-7c. Due to the offset between the cartridge's axis and the pivot locations, friction on the stylus tends to draw the tonearm laterally inward or outward and can distort the balance of the sound and cause uneven wear on the stylus. FIGS. 7a-7c show an embodiment of the present disclosure in which a first magnet 11a is provided on a rear portion of a first extension member 8', and a second magnet 11b and third magnet 11c are provided on a parallel laterally opposite rear portion of a second extension member 8'. The first magnet 11a is disposed at a longitudinal location that is aligned with a longitudinal midpoint between the second and third magnets, when the first extension member and second extension member 8' are un-pivoted, as shown in FIG. 7b. Thus, in such embodiments, when the extension members 8' are un-pivoted and extending straight as shown in FIG. 7b (See, Also, e.g., FIG. 5b), then the first magnet 11a is generally equal distance from the second magnet 11b and third magnet 11c, with the second magnet 11b being offset in a forward direction from the first magnet 11a, and the third magnet 11c being offset in a rearward direction from the first magnet 11a. Also, in some embodiments, the first magnet 11a has a laterally inward facing pole that is attracted to the laterally inward facing poles of the second and third magnets, and as such, equal magnetic component forces are exerted on the first magnet in both a rearward and forward direction, to help stabilize the relative positions of the extension members 8' against pivoting. Also, when the forward portions of the extension members 8' are pivoted laterally toward a center of the turntable toward the spindle 4, such as shown in FIGS. 5a and 7a, since the pivot location 28 is fixed on the both extension members, the overall longitudinal alignment of the extension members 8' becomes off-set, and thus, the first magnet 11a shifts closer to the second (forward) magnet 11b, so that attractive force exerted between the first and second (forward) magnet is greater than that between the first magnet and third (rearward) magnet, to help stabilize the pivoted position of the extension members 8'. The opposite effect is imparted when forward portions of the extension members 8' are pivoted laterally outward away from the spindle 4, in that the first magnet 11a then longitudinally shifts closer to the third (rearward) magnet 11c, so that the attractive forward between the first and third magnet, is greater than the attractive force between the first and second magnet, again helping to stabilize the current pivoted position of the extensions members 8' (or tonearm) overall. As will be appreciated by those skilled in the art after reviewing this disclosure, the configuration of the multiple magnets 11a, 11b and 11c on the extension members can thus help counter skating due to its stabilizing effect on the position of the tonearm 8.

In some embodiments, the tonearm assemblies of the present disclosure (e.g., tonearm 8 with laser source and electromagnetic assembly, and receiver (with beam splitter and sensors)), can be installed by a user on a pre-existing turntable 2, along with the receiver housing 18. As such, the tonearm 8 and receiver housing 18 can require calibration. Referring to FIG. 3b, in some embodiments, a calibration laser is provided within the receiver housing 18, which can emit a calibration laser beam 20 that is useable for aligning the receiver housing 18 with the platter spindle 4. For example, the beam splitter 14 can be disposed in the receiver housing 18, such that when a user activates the calibration laser and aligns the calibration laser beam 20 to strike the center spindle 4 of the turntable at 90 degrees to a tangent line of the turntable, then the symmetrical beam splitter 14 can be positioned such that when the refracted laser 12 bisects it through the apex edge, the needle on the tonearm 8 will be aligned for travel along the linear radial path "R."

As can be seen in FIGS. 3a and 3b, in some embodiments, tonearm adjustment members 17 are provided, for use in adjusting a length of a portion of the tonearm 8. The adjustment can comprise turning the adjustment members 17 to loosen a front portion 8" of each extension member 8' of the tonearm 8 shaft relative to a middle portion 8''' thereof, to allow the respective portions 8", 8''' to telescopically slide in relation to one another, in order for a user to shorten or elongate the total length of the tonearm 8. For example, when the tonearm 8 is installed on a turntable, after a position of the receiver housing 8 is calibrated, the tonearm 8 length can be adjusted so that the needle rests on the linear radial path "R" throughout motion along a record being played, as will be appreciated by those skilled in the art after reviewing this disclosure.

FIG. 4 shows another alternative for some embodiments of the present disclosure, in which the laser beam received on the beam splitter 14 has not been be previously refracted, but instead, is directly emitted from a laser source 22 attached to a front section 29 of the tonearm 8, immediately before the cartridge 10. In such embodiments, the laser source 22 can be positioned to emit a guiding laser beam having an axis that is aligned at 90 degrees relative to a longitudinal axis of the front section 29. As such, no refraction mirror is required in such embodiments. Also, in such embodiments, an alignment or calibration beam 20 can be provided via a separate source housed in a separate calibration light housing 20'.

Still referring to FIG. 4, in this alternative embodiment, a refractor 14' can be provided that is positioned above the beam splitter 14, in a configuration in which the incoming laser 12 from the laser source 22 is refracted downward by refractor 14' before impinging on the beam slipper 14, with an apex edge of the beam splitter 14 facing upward to meet the downwardly refracted beam 22. Similar to the previously described embodiments, the split beams from the beam splitter can then be detected by opposite sensors 16 to determine relative intensity, based upon which, control signals are sent to the electromagnet assembly 30.

In some embodiments, a user can install a turntable assembly comprising the tonearm 8 with base plate 27 (including electromagnetic assembly 30), receiver (beam splitter and opposite sensors, which can be contained in a receiver housing 18), and calibration laser source (which can be mounted together on a base 23 (See. e.g., FIG. 4) with the receiver in some embodiments). The turntable assembly can be installed on an existing turntable system to replace the prior art tonearm and tonearm mount, with the tonearm 8 and electromagnetic assembly 30.

Figure 8:
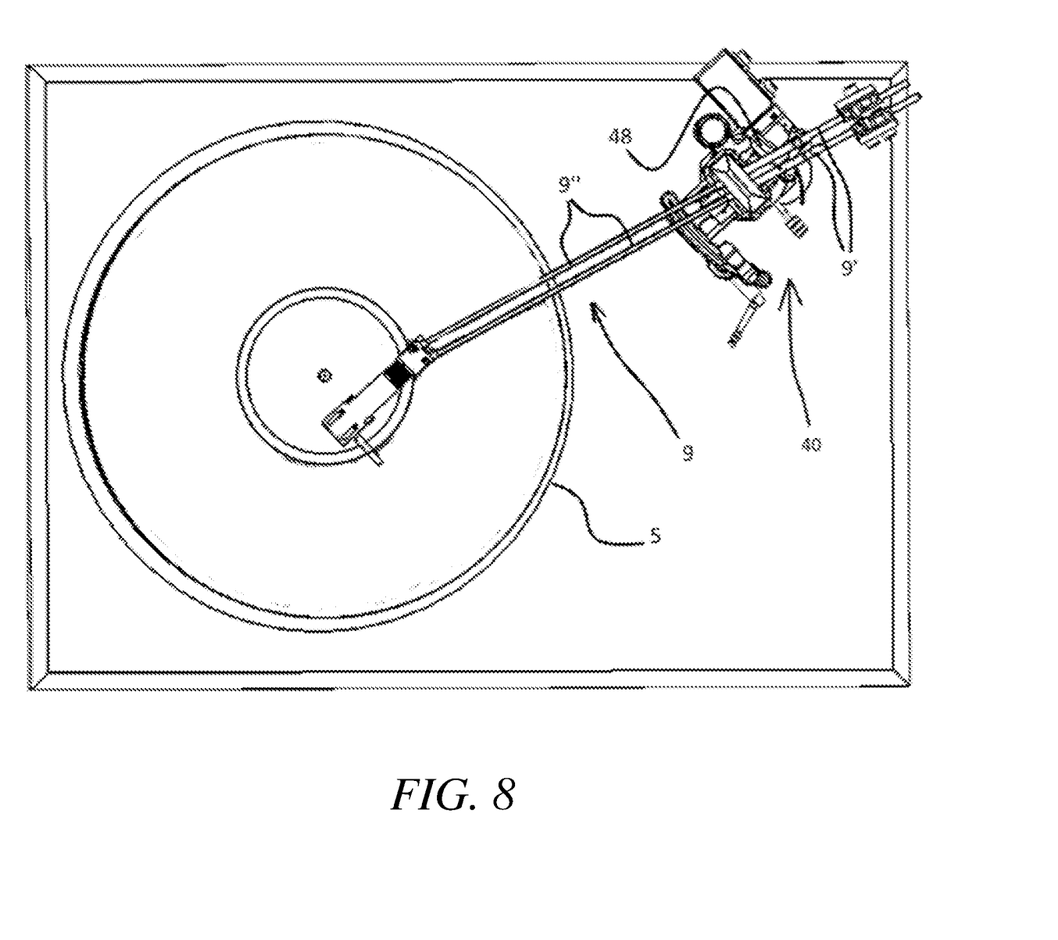
FIG. 8 is a simplified overhead plan view showing a platter and tonearm assembly, including a mechanically actuated linear tracking system for some embodiments of the present disclosure, which does not rely on a laser or electromagnet assembly.
Figure 9:
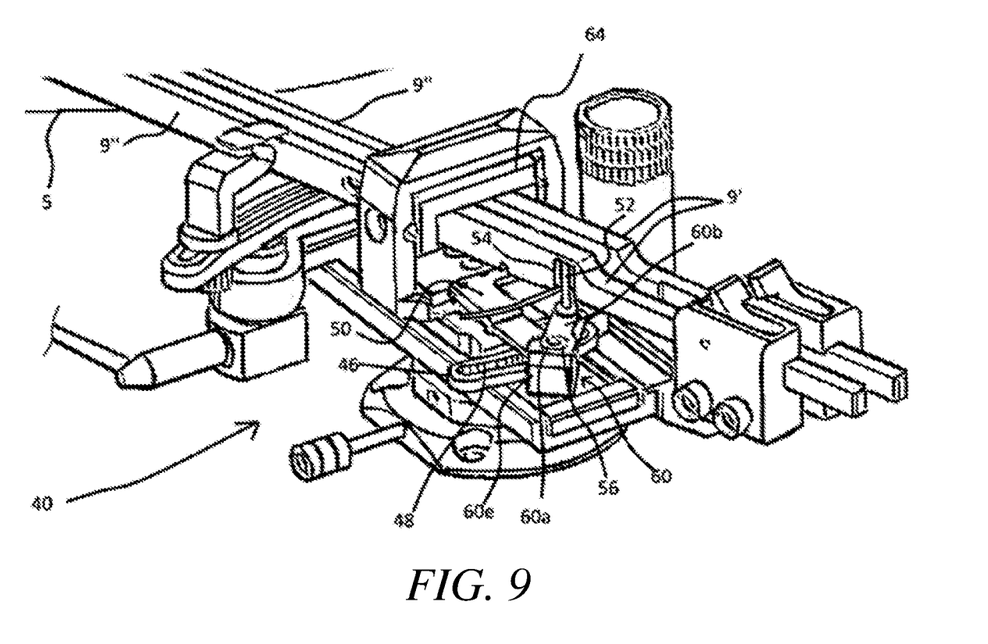
FIG. 9 is a perspective view of the tracking system of FIG. 8.

Referring to FIG. 8, in some embodiments, a platter 5 and tonearm 9 assembly is provided without the electromagnet assembly 30 described above. In this embodiment, a mechanical embodiment, the tonearm is controlled by an alternate tracking system 40. Tracking system 40 enables linear tonearm 9 tracking along a radius path "R," similar to that shown and described above with respect to FIG. 5a, except in a different manner than the electromagnetic assembly 30. That is, instead of controlling a position of a rear pivot by adjusting electromagnetic force, the track system 40 adjusts a position of a rear pivot by use of mechanically interacting components.

Figure 10:
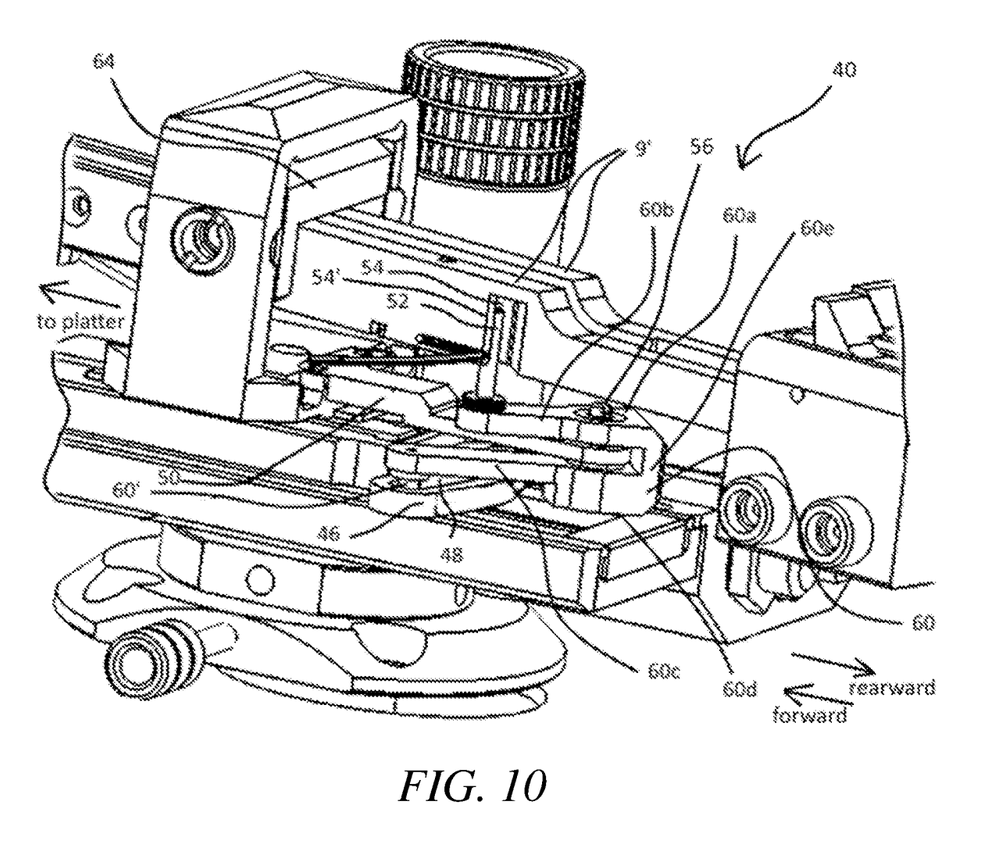
FIG. 10 is a close-up side perspective view of the tracking system of FIG. 8.
Figure 11:
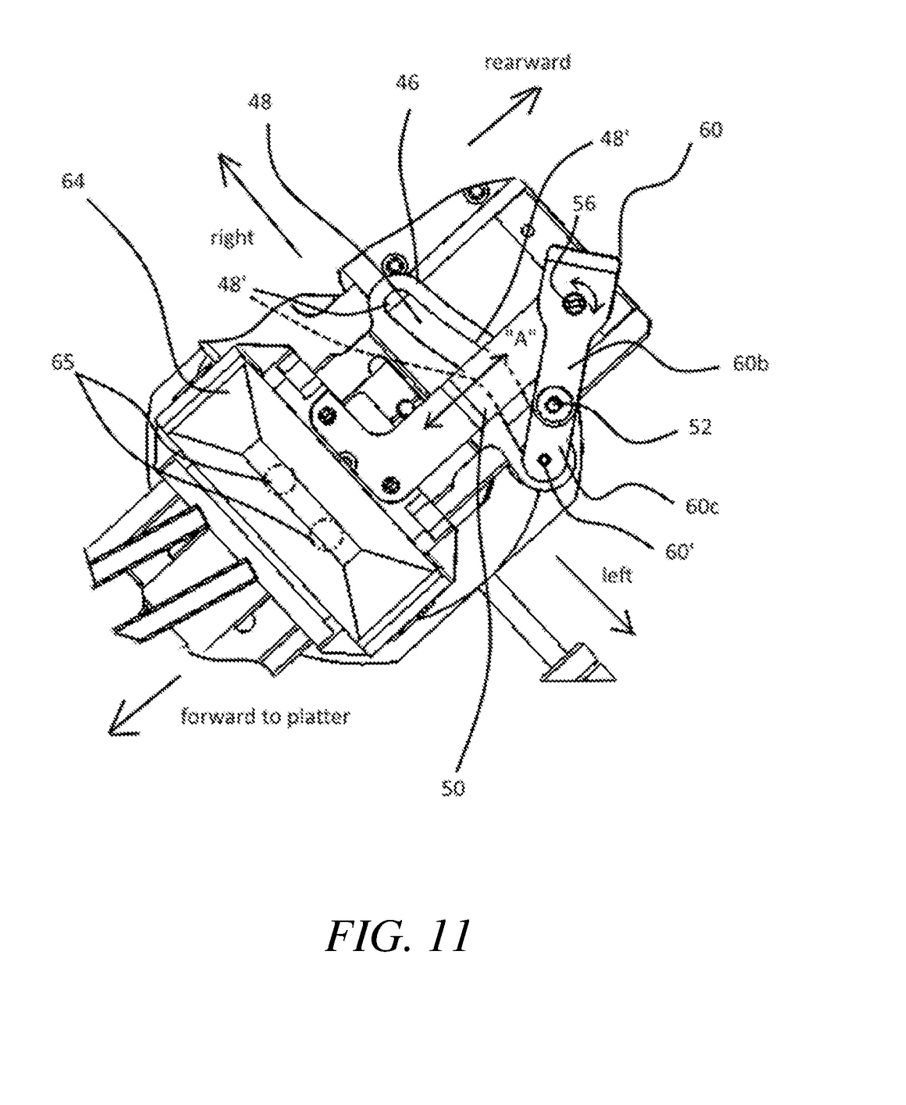
FIG. 11 is a close-up partial overhead plan view of the tracking system of FIG. 8, with the tonearm extension members removed so that a top view can be seen of the joint member, hitch member, and guiding slot.
Figure 12:
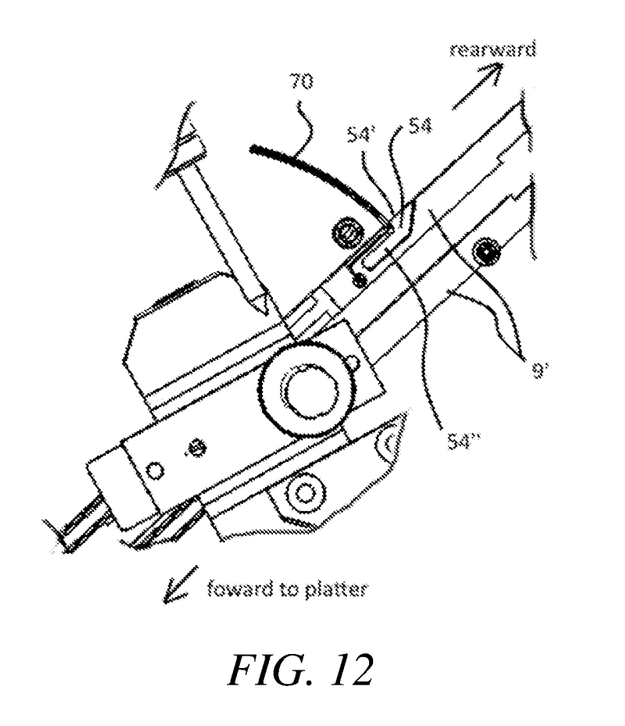
FIG. 12 is a close-up partial bottom plan view of the tracking system of FIG. 8, with various components not shown so that the pin chamber in the tonearm extension member can be clearly seen.

Referring to FIGS. 9-12, the tracking system 40 connects to tonearm frame members 9'' of a tonearm 9, by pivot connections 65 on a longitudinally slidable pivot bridge 64 (or pivot base). Tonearm 9 is able to pivot about the pivot connections within a lateral plane that is parallel to the platter as necessary to allow the tonearm 9 to track grooves in a record. The slidable nature of the pivot bridge 64 allows the pivot connections 65 (e.g., rear pivot) to be adjusted for maintaining linear tracking for the tonearm, similar to the manner described above, except that the manner of control is unique. A hitch member 50 is connected to the pivot bridge 64, and the hitch member 50 is pushed and pulled by movement of the tonearm 9, to slide the pivot bridge forward or rearward respectively. A pair of tonearm extension members 9' extend longitudinally rearward from parallel tonearm frame members 9'', with at least one extension member 9' including a pin chamber 54 (see, e.g., bottom plan view of extension member 9' in FIG. 12, and see perspective views in FIGS. 9 & 10). The pin chamber 54 receives a pin 52 that extends upward into the pin chamber 54 from a joint member 60, and the joint member 60 is pivotably connected to the hitch member 50. The pin 52 is movable within the pin chamber 54, such as to slide longitudinally within the pin chamber 54. Referring to FIG. 12, the pin chamber 54 includes a side opening 54' on a side of the extension member 9' (or tonearm 9), to receive the pin 52 laterally, and a longitudinally extending bottom opening 54'' on a bottom of the extension member 9', so that the pin 52 can extend into the pin chamber 54 from the joint member 60 below the extension member 9' and move longitudinally within the pin chamber 54.

As best seen in FIG. 10, the pivot joint member 60 has a length, with a rear portion 60a pivotally connected to a rearward end portion of the hitch member 50, by a pivot connection member 56, such as a pin, the hitch member 50 itself being, in turn, fixedly connected to the pivot bridge 64, at a lower portion thereof. Moreover, in some embodiments, the pivot joint member 60 includes a top horizontally extending joint member 60b (upper structural feature), and a bottom horizontally extending joint member 60c (lower structural feature), the top and bottom joint members 60b, 60c being to connected together at rearward end portions 60a, 60d thereof, by a vertically extending bridge portion 60e. The pin 52 is connected to the top horizontally extending joint member 60b at a forward portion therefore, opposite its rearward end portion 60a, the pin 52 extending upward therefrom. Also, a guide member 60', such as a pin, is connected to the bottom horizontally extending joint member 60c at a forward portion thereof opposite its rearward end portion 60d, the guide member 60' extending downward therefrom into a guiding slot 48 formed in a nonlinear track 46. The slot 48 may have a lateral length that is curved. That is, it may have a curvature in its length extending from a left side of the tracking system to a right side of the tracking system (relative to FIG. 11). A lower end portion of the guide member 60' (which can also be a pin-like member) is thus slidably snugly contained within the guiding slot 48 such that it can move laterally (left to right, relative to FIG. 11) within the laterally extending nonlinear slot 48.

In some embodiments, a rearward end portion of the hitch 50 is pivotably connected to the joint member 60 by one or more pivot connection members 56 at a rearward end portion 60a, 60d thereof, and the hitch 50 is also disposed in a space or gap between the top horizontally extending joint member 60b and bottom horizontally extending joint member 60c. The longitudinally slidable pivot bridge 64 may be fixedly connected to the hitch member 50, and the tonearm 9 is pivotably connected to the pivot bridge 64. As the tonearm 9 tracks a record groove, it pivots about pivot connections 65 and the joint member 60 is actuated to move by at least one tonearm extension member 9', because the pin 52 inside the pin chamber 54 contacts or abut an interior wall of the tonearm 9 within the pin chamber 54.

For example, as a needle on a cartridge of the tonearm 9 moves from left to right (relative to FIGS. 11 and 12), the tonearm pivots relative to the pivot bridge 64, and the rear portion of the tonearm (e.g., the extension members 9') moves right to left. In turn, the pin 52 is displaced from right to left, causing a forward portion of the pivot joint 60 to pivot right to left as well, relative to the hitch member 50 which does not pivot. This, in turn, causes the guide member 60' to also move from right to left within the curved guiding slot 48, defined by the curved track 46. Referring to FIGS. 10 & 11, the guiding slot configuration 48 can be such that its perimeter walls 48' extend further rearward toward the latterly middle, or central, portion of the slot 48, then the laterally outward portions of the slot. Also, the guide member 60' that extends downward from the forward portion of the joint member 60 can fit snugly within the perimeter walls 48' of the slot 48. Therefore, as the guide member 60' moves or slides right to left within the entire lateral length of the slot 48, it necessarily has a forward and rearward component of movement, which, in turn, pulls or pushes the hitch member 50 in the rearward/forward directions of arrow "A," since the hitch member 50 floats on the location of the slidable pivot bridge 64, which is slidable in the directions of arrow "A" depending on pressure applied to the hitch member 50.

Since the curved slot 48 is configured such that a lateral center portion thereof is longitudinally further rearward away from the platter than the lateral side portions of the curved slot 48, the rear pivot, or pivot connections 65 on the pivot bridge 64 adjust forward or rearward as a function of the rotation of the tonearm 9 by the manner described above. As such, the slot 48 curvature can be configured such that, as the tonearm 9 reaches about a straight alignment relative to the hitch member 50, wherein each of the parallel extension members 9' are aligned, the hitch member 50 can be furthest rearward, as can the pivot bridge 64. Thereafter, as the cartridge continues to move right or left, then the rearward extension members 9' continue to move right or left off center alignment, and the hitch member 50 is then pushed forward, due to the curved slot 48 curving forward on the left and right side portions thereof.

As will be appreciated by those skilled in the art, the extent of push and pull on the hitch member 50 is selected by configuration of the curved guiding slot 48 and pin chamber 54, since both of those parameters can impact movement of the joint member 60, and hence, the hitch member 50. In some embodiments, the curved slot 48, pin chamber 54, and remainder of the tracking system 40 are configured to move the tonearm 9 to allow linear tracking at the cartridge in similar fashion to the cartridge movement shown in FIG. 2 for the laser controlled tonearm, as will be appreciated by those skilled in the art after reviewing this disclosure.

Moreover, as will be appreciated by those skilled in the art upon reading this disclosure, in some embodiments, the tracking system 40 can also incorporate stabilizing magnets, the same or substantially similar to those depicted in FIGS. 4-6, and in particular. FIGS. 7a-7c, and described above accordingly, at rear portions of the extension members 9'.

In some embodiments, a guard member 70 (wire guard) is provided to prevent the pin 52 from escaping. This can occur when the tonearm is positioned off the platter 5 (such as at rest), which could otherwise allow the pin 52 to avoid returning to its pin chamber 54 in the arm.

The various embodiments described herein, including all of the drawings, are presented as non-limiting example embodiments of the present disclosure, unless otherwise expressly indicated. After reviewing the present disclosure, an individual of ordinary skill in the art will immediately appreciate that some details and features can be added, removed and/or changed without deviating from the spirit of the invention. Reference throughout this specification to "one embodiment," "an embodiment," "additional embodiment(s)" or "some embodiments," and analogous terms, mean that a particular feature, structure or characteristic described in connection with the embodiment(s) is included in at least one or some embodiment(s), but not necessarily all embodiments, such that the references do not necessarily refer to the same embodiment(s). Furthermore, the particular features, structures, or characteristics may be combined in any suitable manner in one or more embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A tonearm tracking system for use in playing a record comprising:
    a tonearm;
    a joint member movably connected to the tonearm and movably connected to a track having a nonlinear guiding slot for guiding a guide member of the joint member, the joint member also being connected by a hitch member to a slidable pivot base to which the tonearm is pivotably connected at a rear pivot location; and
    wherein the slidable pivot base is slidable in a rearward and forward direction in response to pressure applied to the hitch member by the joint member, the hitch member extending longitudinally rearward from the slidable pivot base.

2. The tonearm tacking system of claim 1 wherein the joint member includes a top horizontally extending joint member, and a bottom horizontally extending joint member and a pin extends upward from a fixed location relative to the top horizontally extending joint member.

3. The tonearm tacking system of claim 2 wherein the fixed location is on a forward portion of the top horizontally extending joint member.

4. The tonearm tacking system of claim 3 wherein a rearward portion of the joint member is pivotably connected to the hitch member.

5. The tonearm tracking system of claim 1 wherein the joint member includes an upper structural feature and a lower structural feature, the structural features being separated, and wherein a rearward portion of the hitch member is pivotably connected to a rearward portion of at least one of the upper structural feature and lower structural feature.

6. The tonearm tracking system of claim 5 wherein the hitch member extends between the upper structural feature and the lower structural feature.

7. A method of guiding a tonearm to track in a linear manner comprising:
    applying pressure against a stylus of the tonearm; and
    moving a joint member as a result of the pressure, the joint member being movably connected to a guiding slot having a nonlinear configuration and the joint member being movably connected to a slidable pivot base to which the tonearm is pivotably connected; and
    moving a pin of the joint member within the tonearm as a result of the pressure.

8. The method of claim 7 wherein the joint member is movably connected to the pivot base by being connected to a hitch member that is in turn, connected to the pivot base.

9. The method of claim 8 further comprising pivoting the joint member relative to the hitch member as a result of the pressure applied against the tonearm stylus.

10. The method of claim 9 wherein the joint member includes an upper joint member and lower joint member, and wherein the hitch member is connected to the joint member between the upper joint member and the lower joint member.

11. The method of claim 8 further comprising moving a guide member within the guiding slot as a result of the pressure applied to the stylus, wherein the guiding slot has a laterally central portion that is disposed further forward than at least a lateral side portion of the slot.

12. The method of claim 11 further comprising moving the guide member from the laterally central portion of the slot to the lateral side portion of the slot.

13. The method of claim 12 further comprising pushing the slidable pivot base in mechanical response to the movement of the guide member from the laterally central portion of the slot to the lateral side portion of the slot.

14. The method of claim 11 further comprising moving the guide member from the lateral side portion of the slot to the laterally central portion of the slot.

15. The method of claim 14 further comprising pulling the slidable pivot base in mechanical response to the movement of the guide member from the lateral side portion of the slot to the laterally central portion of the slot.

16. A tonearm tracking system for use in playing a record comprising:
    a tonearm;
    a joint member movably connected to the tonearm and movably connected to a track having a nonlinear guiding slot for guiding a guide member of the joint member, the joint member also being connected by a hitch member to a slidable pivot base to which the tonearm is pivotably connected at a rear pivot location;
    wherein the joint member includes a top horizontally extending joint member, and a bottom horizontally extending joint member, and wherein the hitch member is pivotably connected to the joint member between the top horizontally extending joint member and the bottom horizontally extending joint member; and
    further comprising a pin chamber on the tonearm and a pin extending from the joint member and received within the pin chamber, the pin chamber extending longitudinally along the tonearm and the pin being moveable longitudinally within the pin chamber by pivoting the tonearm relative to the slidable pivot base.

17. A tonearm tracking system for use in playing a record comprising:
    a tonearm;
    a joint member movably connected to the tonearm and movably connected to a track having a nonlinear guiding slot for guiding a guide member of the joint member, the joint member also being connected by a hitch member to a slidable pivot base to which the tonearm is pivotably connected at a rear pivot location; and wherein the guiding slot is curved and wherein the guide member extends downward from a lower structural element of the joint member into the guiding slot, and wherein the joint member further comprises an upper structural feature spaced apart from the lower structural feature, and wherein a pin extends upward from the upper structural feature to the tonearm.

* * * * *